United States Patent
Wu

(10) Patent No.: US 12,505,063 B2
(45) Date of Patent: Dec. 23, 2025

(54) SIGNAL TRANSMISSION METHOD AND ASSOCIATED HOST DEVICE AND ELECTRONIC DEVICE

(71) Applicant: Realtek Semiconductor Corp., HsinChu (TW)

(72) Inventor: Lin-Chi Wu, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 33 days.

(21) Appl. No.: 18/661,745

(22) Filed: May 13, 2024

(65) Prior Publication Data

US 2024/0394211 A1    Nov. 28, 2024

(30) Foreign Application Priority Data

May 26, 2023   (TW) ................................ 112119702

(51) Int. Cl.
*G06F 13/42*    (2006.01)
*G06F 13/38*    (2006.01)

(52) U.S. Cl.
CPC ........ *G06F 13/4282* (2013.01); *G06F 13/382* (2013.01); *G06F 2213/0042* (2013.01)

(58) Field of Classification Search
CPC .............. G06F 13/4282; G06F 13/382; G06F 2213/0042
See application file for complete search history.

(56) References Cited

U.S. PATENT DOCUMENTS

| | | | | |
|---|---|---|---|---|
| 6,931,501 | B1* | 8/2005 | Narayanaswamy | G06F 3/0613 710/39 |
| 2010/0088297 | A1* | 4/2010 | Kiilerich | H04L 67/04 707/E17.014 |
| 2015/0186141 | A1* | 7/2015 | Plotnikov | G06F 9/30038 712/210 |
| 2016/0041759 | A1* | 2/2016 | Han | G06F 3/0679 711/103 |
| 2016/0314087 | A1* | 10/2016 | Poulsen | G06F 13/362 |
| 2019/0051324 | A1* | 2/2019 | Zhao | G06F 3/0616 |
| 2022/0100411 | A1* | 3/2022 | Donley | G06F 3/0655 |

FOREIGN PATENT DOCUMENTS

| CN | 115550442 A | 12/2022 |
|---|---|---|
| TW | 1774618 B | 8/2022 |

* cited by examiner

*Primary Examiner* — Henry Tsai
*Assistant Examiner* — Harry Z Wang
(74) *Attorney, Agent, or Firm* — Winston Hsu

(57) ABSTRACT

The present invention provides a signal transmission method used in a host device. The signal transmission method comprises the steps of: receiving a plurality of commands, wherein the plurality of commands comprise at least two different types of commands; aggregating the plurality of commands to generate an aggregated command; and transmitting the aggregated command to an electronic device through a first interface circuit.

8 Claims, 5 Drawing Sheets

SIGNAL TRANSMISSION METHOD AND ASSOCIATED HOST DEVICE AND ELECTRONIC DEVICE

BACKGROUND OF THE INVENTION

1. Field of the Invention

The present invention relates to a signal transmission method.

2. Description of the Prior Art

In an electronic device that performs control transfer through a Universal Serial Bus (USB), since a time interval of the control transfer is scheduled by a host device, there may be a problem that a control transfer handshake time is too long. In addition, each read operation or write operation through the USB interface requires a complete control transfer process, so executing a large number of read commands/write commands will take a lot of time, resulting in a decrease in overall efficiency.

SUMMARY OF THE INVENTION

It is therefore an objective of the present invention to provide a signal transmission method, which can aggregate multiple commands and transmit them together, so solve the problems described in the prior art.

In one embodiment of the present invention, a signal transmission method used in a host device is disclosed. The signal transmission method comprises the steps of: receiving a plurality of commands, wherein the plurality of commands comprise at least two different types of commands; aggregating the plurality of commands to generate an aggregated command; and transmitting the aggregated command to an electronic device through a first interface circuit.

In one embodiment of the present invention, a host device comprising a command aggregation module and an interface circuit is disclosed. The command aggregation module is configured to receive a plurality of commands, and aggregate the plurality of commands to generate an aggregated command, wherein the plurality of commands comprise at least two different types of commands. The interface circuit is configured to transmit the aggregated command to an electronic device.

In one embodiment of the present invention, an electronic device comprising an interface circuit, a command de-aggregation module and a control circuit is disclosed. The interface circuit is configured to receive an aggregated command. The command de-aggregation module is coupled to the interface circuit, and is configured to perform a de-aggregation operation on the aggregated command to generate a plurality of commands, wherein the plurality of commands comprise at least two different types of commands. The control circuit is coupled to the command de-aggregation module, and is configured to analyze the plurality of commands and transmit the plurality of commands to a plurality of circuit modules for execution.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
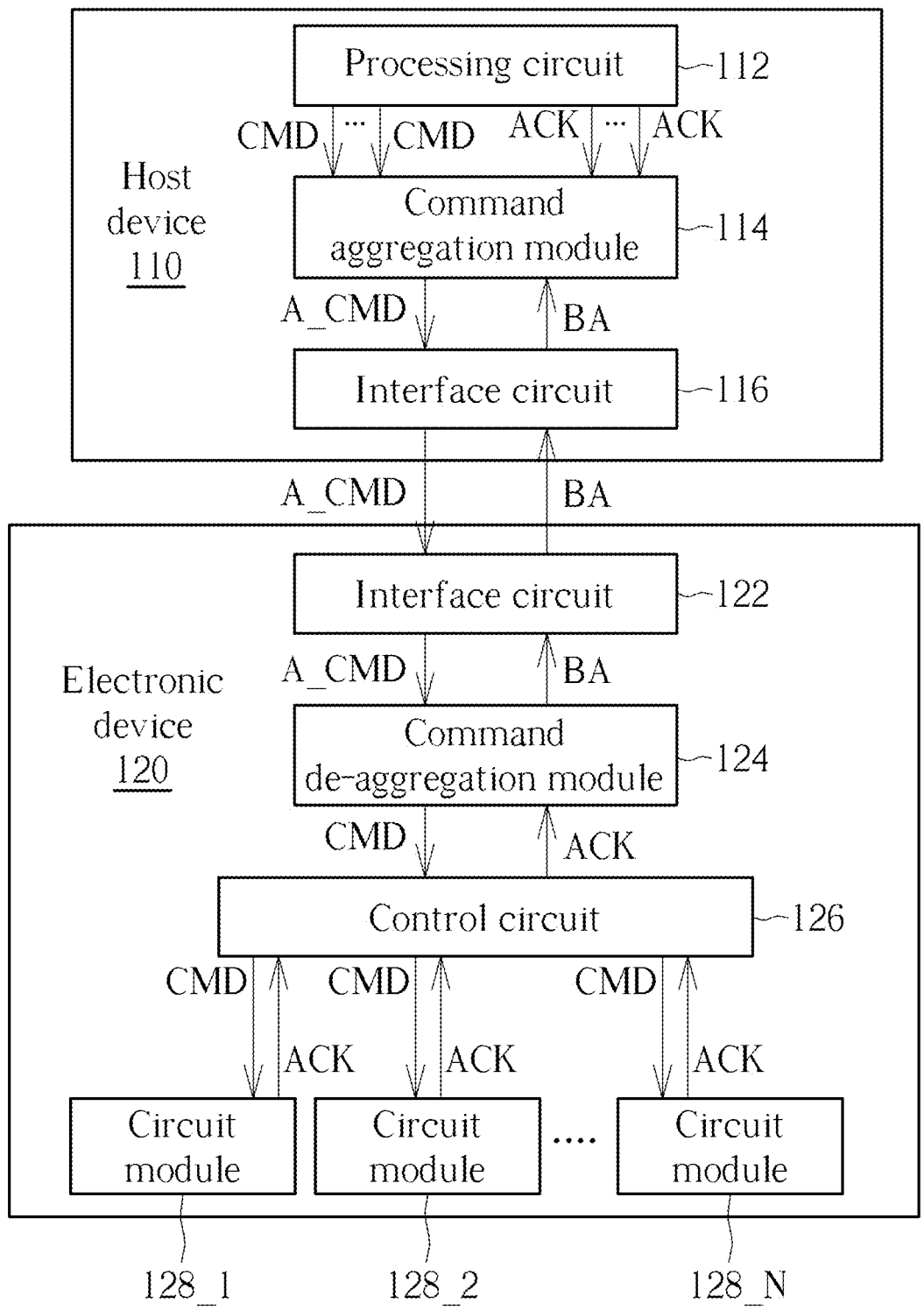
FIG. 1 is a diagram illustrating a host device and an electronic device according to one embodiment of the present invention.

FIG. 1 is a diagram illustrating a host device 110 and an electronic device 120 according to one embodiment of the present invention. As shown in FIG. 1, the host device 110 comprises a processing circuit 112, a command aggregation module 114 and an interface circuit 116. The electronic device 120 comprises an interface circuit 122, a command de-aggregation module 124, a control circuit 126 and a plurality of circuit modules 128_1-128_N. In this embodiment, the host device 110 can be any product that can generate commands to the electronic device 120, such as a desktop computer, a notebook or any other portable device. The electronic device 120 can be externally connected to the host device 110 or installed in the host device 110. In addition, the interface circuits 116 and 122 used to connect the host device 110 and the electronic device 120 may be compliant with the USB, a Peripheral Component Interconnect Express (PCIe), a Secure Digital Input and Output (SDIO), a Universal Asynchronous Receiver/Transmitter (UART), an Internal Integrated Circuit (Inter-Integrated Circuit, I2C), a Serial Peripheral Interface (SPI), or any other suitable interface.

In this embodiment, the electronic device 120 may be an external network card, and the processing circuit 112 within the host device 110 is used to execute a Wi-Fi driver to generate a plurality of commands to the electronic device 120. The circuit modules 128_1-128_N in the electronic device 120 may include a media access control (MAC) layer circuit, a baseband circuit, a radio frequency (RF) circuit, etc., however, the present invention is not limited thereto. The command aggregation module 114 may be implemented by using a hardware circuit, or may be integrated into the processing circuit 112 and implemented in software. The command de-aggregation module 124 can be implemented by using a hardware circuit, or using a firmware to perform its operations.

In the operation of the embodiment shown in FIG. 1, first, the processing circuit 112 sequentially generates a plurality of commands CMDs, where the command CMDs include different types of input/output commands (I/O commands). For example, the commands CMDs may include a write command, wherein the write command includes information such as an offset, a mask and a value, which are used to write the value into temporary registers with the offset in one of the circuit modules 128_1-128_N. The commands CMDs may include a compare command, where the compare command includes two offsets and corresponding masks, which are used to compare whether the data of two sets of registers respectively with the two offsets in one of the circuit modules 128_1-128_N are consistent. The commands CMDs may include a delay command, wherein the delay command includes a delay time to instruct one of the circuit modules 128_1-128_N to delay a command by the delay time before continuing processing the subsequent command. The commands CMDs may include a move command, wherein the move command includes a first offset, a second offset and a mask to move the data of the register with the first offset to the register with the second offset in one of the circuit modules 128_1-128_N, and the mask is used to indicate the writing length of the data.

Next, after the command aggregation module 114 receives the commands CMDs from the processing circuit 112, it aggregates the commands CMDs to generate an aggregated command A_CMD, and transmits the aggregated command A_CMD to the electronic device 120 through the interface circuit 116.

The interface circuit 122 transmits the received aggregated command A_CMD to the command de-aggregation module 124, and the command de-aggregation module 124 performs a de-aggregation operation on the aggregated command A_CMD to generate the command CMDs. The commands CMDs generated by the command de-aggregation module 124 may be the same as the commands CMDs previously generated by the processing circuit 112. Then, the control circuit 126 analyzes the command CMDs and transmits the contents of the command CMDs to the corresponding circuit modules 128_1-128_N, respectively. Each of the circuit modules 128_1-128_N will send an acknowledgment (ACK) after successfully processing the received command, and transmit it to the command de-aggregation module 124 through the control circuit 126, for the command de-aggregation module 124 to generate (integrates into) a block acknowledgment BA. Each ACK is used to indicate whether the corresponding command CMD is successfully executed. The block acknowledgement BA integrates multiple ACKs from the circuit modules 128_1-128_N, and the ACKs included in the block acknowledgement BA respectively correspond to the commands CMDs of the aggregated command A_CMD. Then, the block acknowledgement BA will be sent to the host device 110 through the interface circuit 122.

In this embodiment, the sequence of the ACKs included in the block acknowledgment BA is the same as the sequence of the commands in the aggregated command A_CMD, that is, the first ACK in the block acknowledgment BA corresponds to the first command in the aggregation command A_CMD, the second ACK in the block acknowledgment BA corresponds to the second command in the aggregation command A_CMD, . . . , and so on. By generating the block acknowledgment BA, it can be ensured that the order of ACKs and the order of the commands CMDs are consistent, so as to avoid sequence errors causing subsequent operational problems of the host device 110.

The interface circuit 116 of the host device 110 transmits the received block acknowledgment BA to the command aggregation module 114, and the command aggregation module 114 de-aggregates the block acknowledgment BA into ACKs, for the processing circuit 112 to determine whether the previously generated commands CMDs are successfully executed by the circuit modules 128_1-128_N respectively.

In one embodiment, the command aggregation module 114 can actively determine whether the status carried in the received block acknowledgment BA indicates that the command execution is successful. If the block acknowledgment BA indicates that each command is successfully executed by the circuit modules 128_1-128_N, the command aggregation module 114 begins to aggregate the subsequent commands from the processing circuit 112 to generate a next aggregated command A_CMD to the electronic device 120.

If the block acknowledgment BA indicates that one or more commands is not been successfully executed by the circuit modules 128_1-128_N, the command aggregation module 114 will directly retransmit the aggregated command A_CMD temporarily stored therein to the electronic device 120, for the circuit modules 128_1-128_N to execute the previously unsuccessfully executed commands again.

As described in the above embodiments, the command aggregation module 114 aggregates multiple different types of commands and then transmits them, which can effectively shorten the data transmission time between the host device 110 and the electronic device 120. Therefore, the interface circuits 116 and 122 have more time to stay in the power saving mode or the sleep state to reduce the power consumption of the host device 110 and the electronic device 120.

In one embodiment of the present invention, if the interface circuits 116 and 122 support the USB standard, the interface circuits 116 and 122 can complete the aggregation and processing of multiple commands under a single control transfer. Specifically, referring to FIG. 2, after the interface circuit 116 receives the aggregated command A_CMD generated from the command aggregation module 114, the interface circuit 116 will start to perform control transfer, where the control transfer includes three stages, in order, a setup stage, a data stage and a status stage. First, in the setup stage, the interface circuit 116 sends a setup token to the electronic device 120, and then sends a USB setup command to the electronic device 120, for the de-aggregation module 124 to know the subsequent data parsing method in the data stage. For example, the USB setup command may include a length and a format of the aggregated command A_CMD, where the format may include the size of each command CMD and/or the offset of the each command in the aggregated command A_CMD. After receiving the USB setup command, the command de-aggregation module 124 sends an ACK to the interface circuit 116 to complete the setup stage of the control transfer.

In the data stage, the interface circuit 116 sends an OUT token to the electronic device 120, and then sends the aggregated command A_CMD to the electronic device 120. After receiving the aggregated command A_CMD, the command de-aggregation module 124 sends an ACK to the interface circuit 116 to complete the data stage of the control transfer. In addition, since the command de-aggregation module 124 has already known the length and the format of the aggregated command A_CMD in the setup stage, the command de-aggregation module 124 can perform a de-aggregation operation on the aggregated command A_CMD to generate the commands CMDs, and transmits these commands CMDs to the control circuit 126 in sequence. Then, the control circuit 126 transmits the commands CMDs to the circuit modules 128_1-128_N for processing. If the circuit modules 128_1-128_N successfully execute the commands, ACKs will be sent to the de-aggregation module 124 through the control circuit 126. If the circuit modules 128_1-128_N fail to execute the commands successfully, the command de-aggregation module 124 will receive an error message through the control circuit 126, or the command de-aggregation module 124 will not receive any ACK after a period of time, at this time the command will be regarded as an execution failure.

Next, in the status stage, the interface circuit 116 sends an IN token to the electronic device 120. After receiving the IN token, if the command de-aggregation module 124 has not yet determined whether the execution of each command is successful, the command de-aggregation module 124 will send a negative acknowledgment (NAK) to the interface circuit 116. If the command de-aggregation module 124 has confirmed whether the execution of each command is successful, the command de-aggregation module 124 will aggregate the received ACKs into a block acknowledgment BA, and block acknowledgment BA is sent to interface circuit 116. After receiving the block acknowledgment BA from the electronic device 120, the interface circuit 116 may further transmit the block acknowledgment BA to the command aggregation module 114. In addition, the processing circuit 112 or the command aggregation module 114 can send an ACK to the command de-aggregation module 124 of the electronic device 120 through the interface circuit 116 to complete the status stage of the control transfer.

In another embodiment of the present invention, if the interface circuits 116 and 122 support the USB standard, the interface circuits 116 and 122 can complete the aggregation and processing of multiple commands under a single bulk transfer. Specifically, referring to FIG. 3, when the interface circuit 116 receives the aggregated command A_CMD generated from the command aggregation module 114, the interface circuit 116 will start to perform the bulk transfer, wherein the bulk transfer includes two stages, in order, a data stage and a status stage. First, in the data stage, the interface circuit 116 sends an OUT token to the electronic device 120, and then sends a header and the aggregated command A_CMD to the electronic device 120. After receiving the aggregated command A_CMD, the command de-aggregation module 124 sends an ACK to the interface circuit 116 to complete the data stage of the bulk transfer. In this embodiment, the head may include a length and a format of the aggregated command A_CMD, where the format may include the size of each command CMD and/or the offset of the each command in the aggregated command A_CMD. Since the command de-aggregation module 124 has already known the length and format of the aggregated command A_CMD according to the received header, the command de-aggregation module 124 can perform a de-aggregation operation on the aggregated command A_CMD to generate the commands CMDs, and transmit these commands CMDs to the control circuit 126 in sequence. If the circuit modules 128_1-128_N successfully execute the commands, ACKs will be sent to the de-aggregation module 124 through the control circuit 126. If the circuit modules 128_1-128_N fail to execute the commands successfully, the command de-aggregation module 124 will receive an error message through the control circuit 126, or the command de-aggregation module 124 will not receive any ACK after a period of time, at this time the command will be regarded as an execution failure.

Next, in the status stage, the interface circuit 116 sends an IN token to the electronic device 120. After receiving the IN token, if the command de-aggregation module 124 has not yet determined whether the execution of each command is successful, the command de-aggregation module 124 will send a NAK to the interface circuit 116. If the command de-aggregation module 124 has confirmed whether the execution of each command is successful, the command de-aggregation module 124 will aggregate the received ACKs into a block acknowledgment BA, and the block acknowledgment BA is sent to interface circuit 116. After receiving the block acknowledgment BA from the electronic device 120, the interface circuit 116 may further transmit the block acknowledgment BA to the command aggregation module 114. In addition, the processing circuit 112 or the command aggregation module 114 can send an ACK to the command de-aggregation module 124 of the electronic device 120 through the interface circuit 116 to complete the status stage of the bulk transfer.

Figure 2:
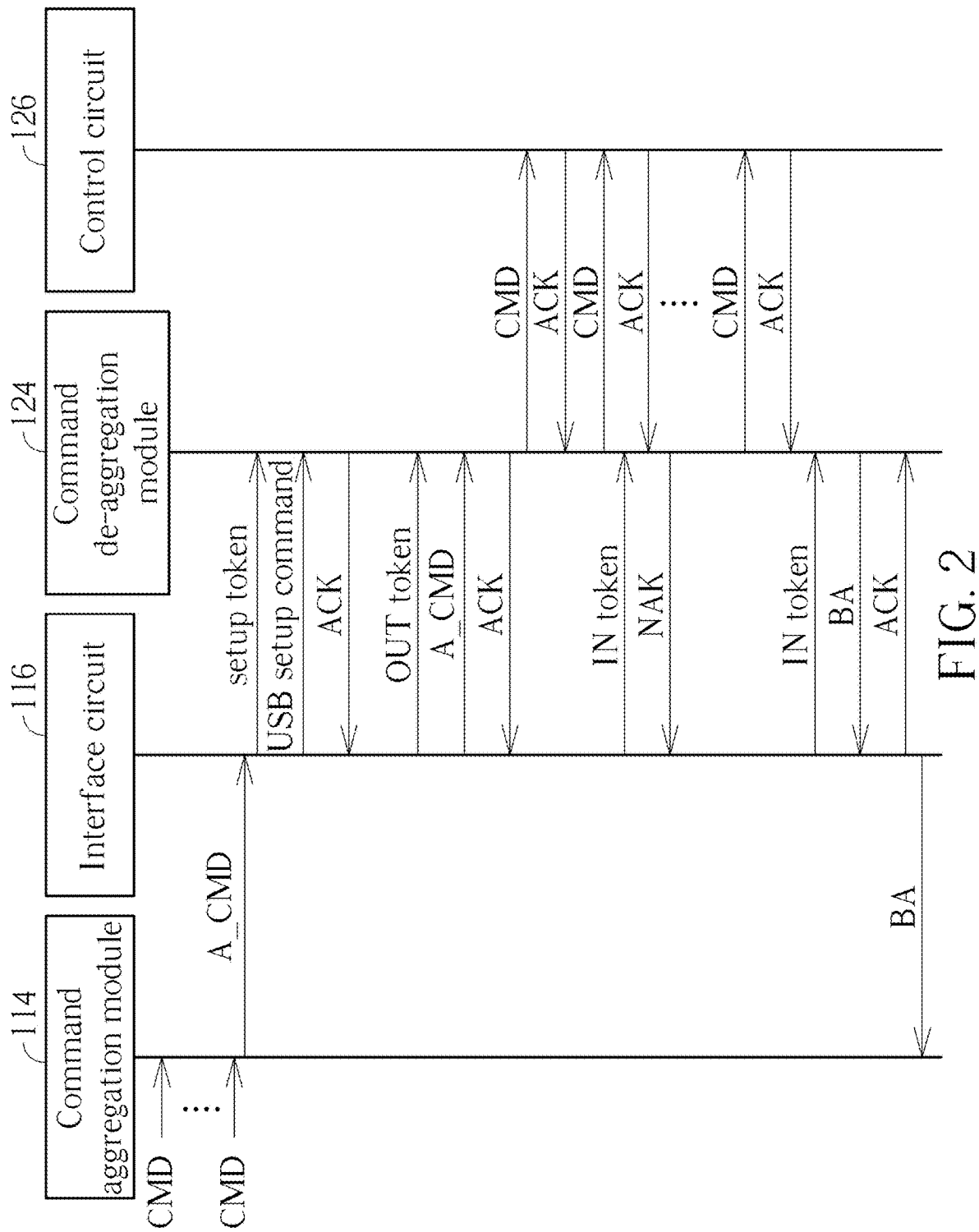
FIG. 2 is a diagram of transmitting aggregated commands according to one embodiment of the present invention.
Figure 3:
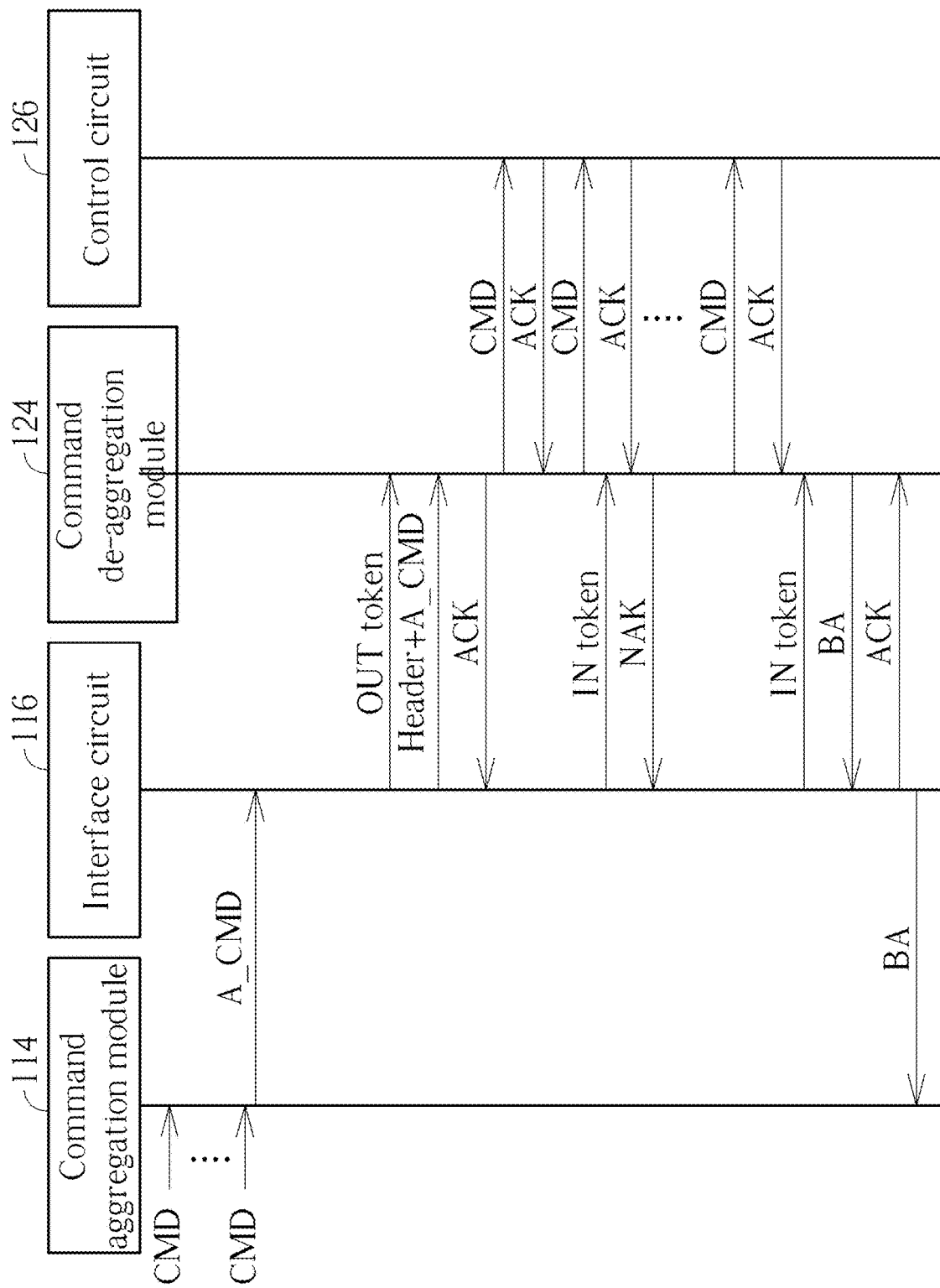
FIG. 3 is a diagram of transmitting aggregated commands according to another embodiment of the present invention.

It is noted that using the USB control transfer or the USB bulk transfer to transmit the aggregated command A_CMD described in the embodiments of FIG. 2 and FIG. 3 is only for illustrative, not a limitation of the present invention. In other embodiments, the interface circuit 116 can transmit the aggregated command A_CMD to the electronic device 120 through USB interrupt transfer or USB isochronous transfer, or the interface circuit 116 can transmit the aggregated command A_CMD to the electronic device 120 through a memory write operation of the PCIe interface, a CMD53 command of the SDIO interface, or any other suitable interface.

Figure 4:
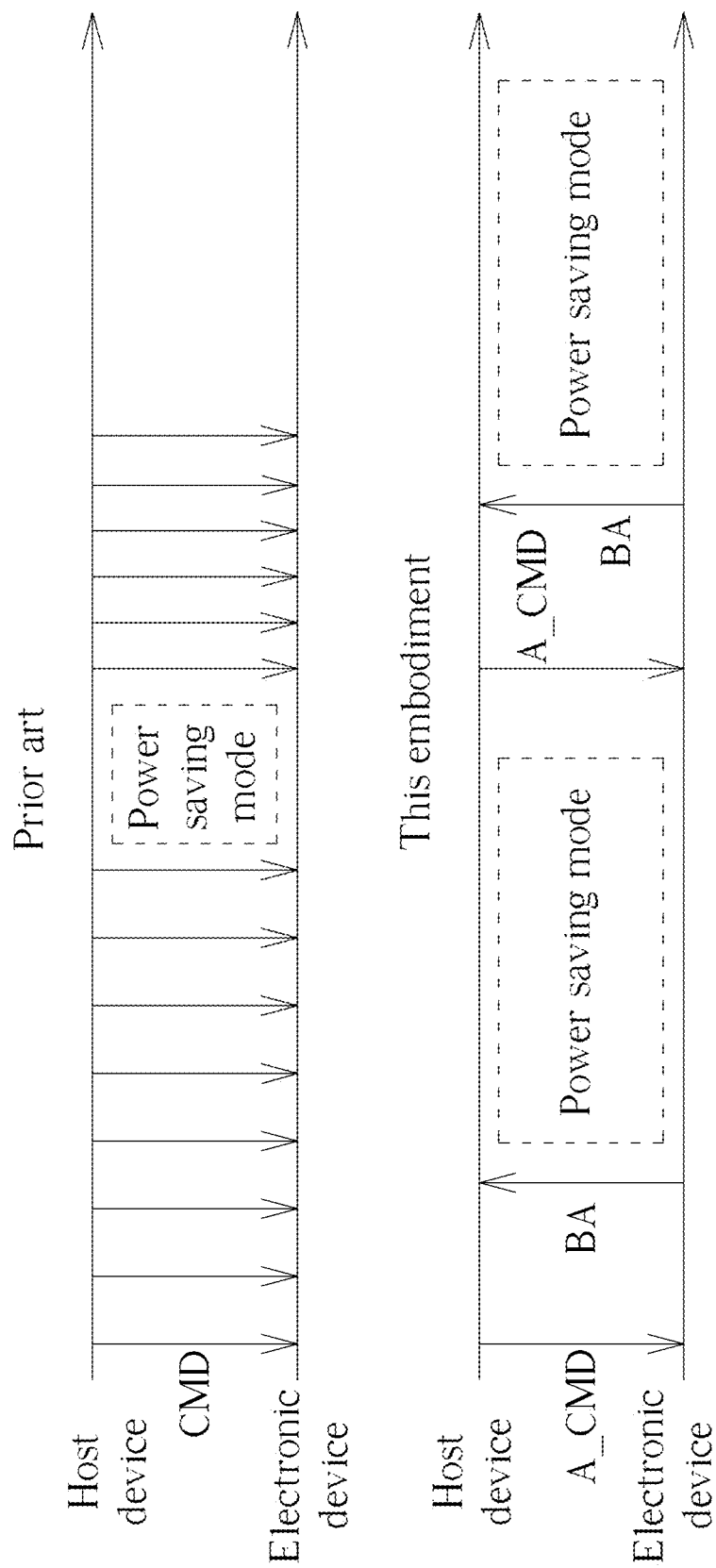
FIG. 4 is a diagram of the present invention which can have a longer power saving mode.

Referring to FIG. 4, in the prior art, since a transfer handshake can only transmit one command, the host device and the electronic device will need more time to transmit data, thus causing the interface circuits 116 and 122 have only a small amount of time to stay in the power saving mode. On the other hand, by using the command aggregation transmission of the present invention, the data transmission time between the host device 110 and the electronic device 120 can be greatly reduced, so the interface circuits 116 and 122 can have more time to stay in the power saving mode. The above-mentioned power saving mode can be a L1 or L2 mode in the PCIe interface, and the power saving mode can be a U1 or U2 mode in the USB interface.

Figure 5:
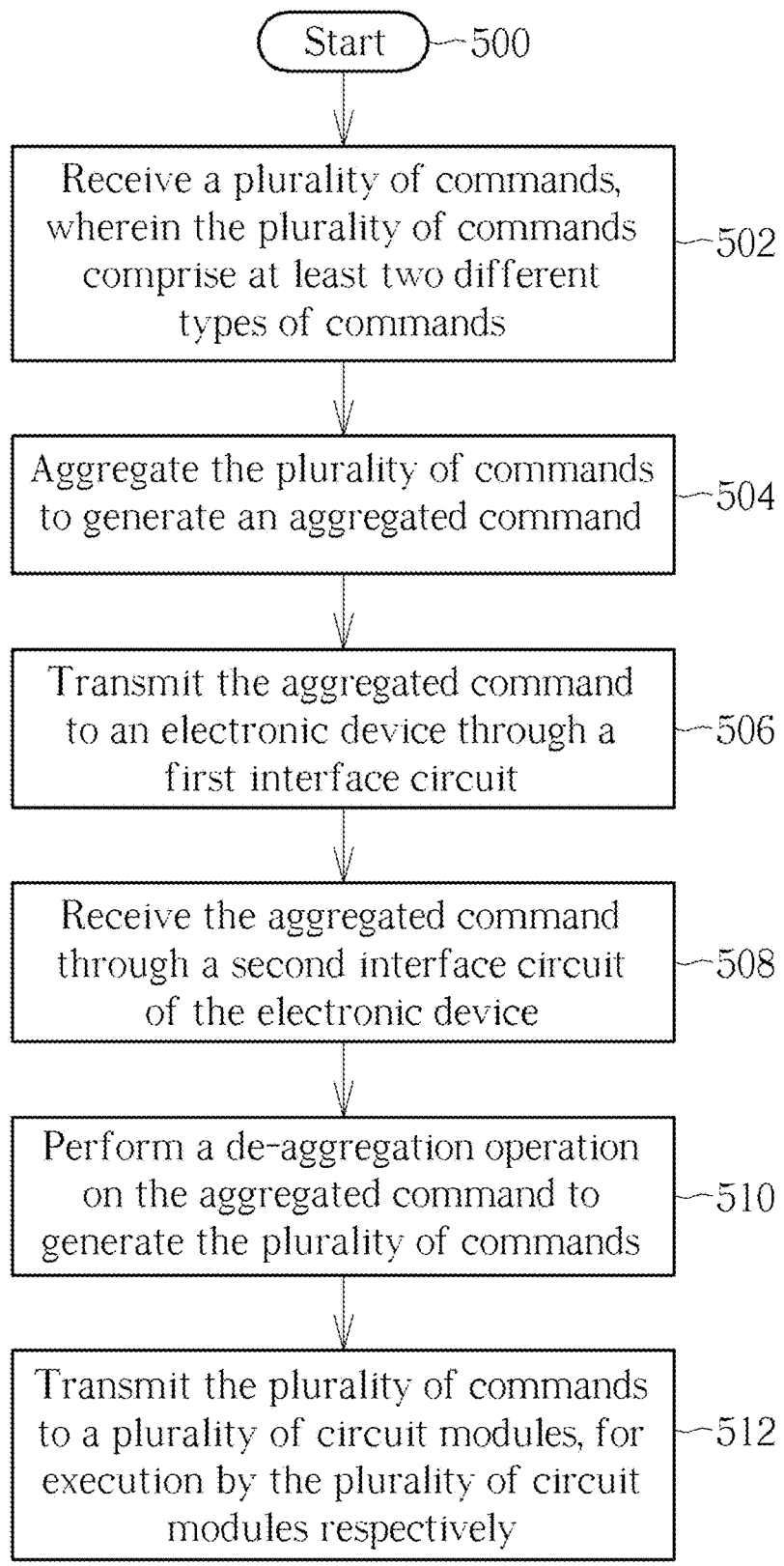
FIG. 5 is a flowchart of a signal transmission method according to one embodiment of the present invention.

FIG. 5 is a flowchart of a signal transmission method according to one embodiment of the present invention. Referring to the above embodiments, the flow of the signal transmission method is described as follows.

Step 500: the flow starts.

Step 502: receive a plurality of commands, wherein the plurality of commands comprise at least two different types of commands.

Step 504: aggregate the plurality of commands to generate an aggregated command.

Step 506: transmit the aggregated command to an electronic device through a first interface circuit.

Step 508: receive the aggregated command through a second interface circuit of the electronic device.

Step 510: perform a de-aggregation operation on the aggregated command to generate the plurality of commands.

Step 512: transmit the plurality of commands to a plurality of circuit modules, for execution by the plurality of circuit modules respectively.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transmission method used in a host device, comprising:
receiving a plurality of commands, wherein the plurality of commands comprise at least two different types of commands;
aggregating the plurality of commands to generate an aggregated command;
transmitting the aggregated command to an electronic device through a first interface circuit;
receiving the aggregated command through a second interface circuit of the electronic device;
performing a de-aggregation operation on the aggregated command to generate the plurality of commands;
transmitting the plurality of commands to a plurality of circuit modules, for execution by the plurality of circuit modules respectively;

receiving a plurality of acknowledgements from the plurality of circuit modules, where each acknowledgment is used to indicate whether the corresponding command is successfully executed; and integrating the plurality of acknowledgements to generate a block acknowledgement; and transmitting the block acknowledgment to the first interface circuit through the second interface circuit.

2. The signal transmission method of claim 1, further comprising:

de-aggregating the block acknowledgment to generate the plurality of acknowledgements, for determining whether the plurality of commands are successfully executed by the plurality of circuit modules respectively.

3. The signal transmission method of claim 1, wherein the plurality of commands comprise at least two of a wire command, a compare command, a delay command and a move command.

4. The signal transmission method of claim 1, wherein the first interface is compliant with a Universal Serial Bus (USB) standard, and the step of transmitting the aggregated command to the electronic device through the first interface circuit comprises:

transmitting the aggregated command to the electronic device under a single control transfer, a single bulk transfer, a single interrupt transfer or a single isochronous transfer.

5. The signal transmission method of claim 1, wherein the first interface circuit is compliant with a USB standard, and the step of transmitting the aggregated command to the electronic device through the first interface circuit comprises:

in a setup stage of a control transfer, transmitting a USB setup command to the electronic device through the first interface circuit, wherein the USB setup command comprises a length and a format of the aggregated command;

in a data stage of the control transfer, transmitting an OUT token and the aggregated command to the electronic device through the first interface circuit; and in a status stage of the control transfer, transmitting an IN token to the electronic device through the first interface circuit.

6. A signal transmission method used in a host device, comprising:

receiving a plurality of commands, wherein the plurality of commands comprise at least two different types of commands;

aggregating the plurality of commands to generate an aggregated command;

transmitting the aggregated command to an electronic device through a first interface circuit;

wherein the first interface circuit is compliant with a USB standard, and the step of transmitting the aggregated command to the electronic device through the first interface circuit comprises:

in a data stage of a bulk transfer, transmitting an OUT token, a header and the aggregated command to the electronic device through the first interface circuit, wherein the header comprises a length and a format of the aggregated command; and in a status stage of the bulk transfer, transmitting an IN token to the electronic device through the first interface circuit.

7. A host device, comprising:

a command aggregation module, configured to receive a plurality of commands, and aggregate the plurality of commands to generate an aggregated command, wherein the plurality of commands comprise at least two different types of commands; and an interface circuit, configured to transmit the aggregated command to an electronic device;

wherein the interface circuit is compliant with a USB standard, and in a setup stage of a control transfer, the interface circuit transmits a USB setup command to the electronic device, wherein the USB setup command comprises a length and a format of the aggregated command; in a data stage of the control transfer, the interface circuit transmits an OUT token and the aggregated command to the electronic device; and in a status stage of the control transfer, the interface circuit transmits an IN token to the electronic device.

8. The host device of claim 7, wherein the plurality of commands comprise at least two of a wire command, a compare command, a delay command and a move command.

* * * * *